Dec. 1, 1925.
W. H. BATES
1,563,957
PROCESS AND APPARATUS FOR PRECIPITATING GOLD FROM SOLUTIONS
Filed July 2, 1923
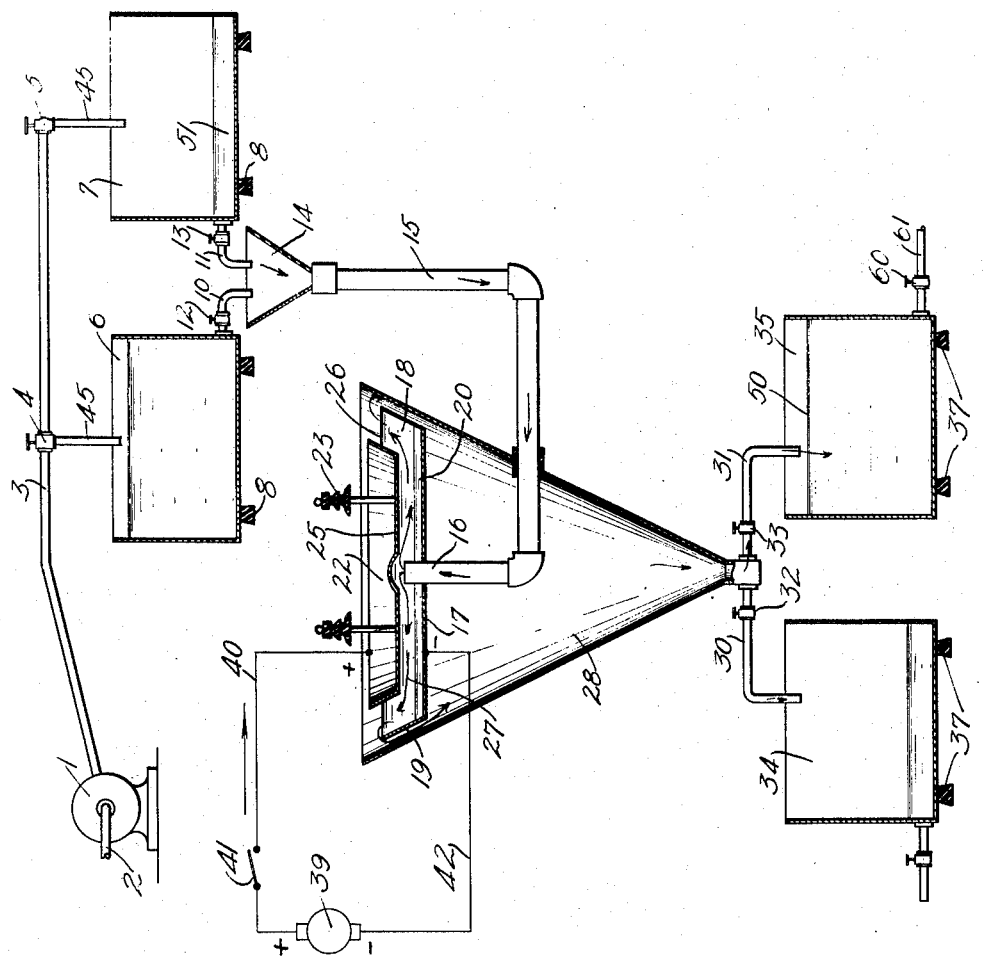
INVENTOR:
Wells H. Bates,
By Graham + Rain
ATTORNEYS.

Patented Dec. 1, 1925.

1,563,957

UNITED STATES PATENT OFFICE.

WELLS H. BATES, OF LOS ANGELES, CALIFORNIA.

PROCESS AND APPARATUS FOR PRECIPITATING GOLD FROM SOLUTIONS.

Application filed July 2, 1923. Serial No. 649,004.

*To all whom it may concern:*

Be it known that I, WELLS H. BATES, a citizen of the United States, residing at Los Angeles, in the county of Los Angeles, State of California, have invented a new and useful Process and Apparatus for Precipitating Gold from Solutions, of which the following is a specification.

This invention relates to the art of reclaiming precious metals from salts and relates particularly to a process and apparatus whereby such metals may be precipitated from mixtures containing such metallic salts.

It is a recognized fact that ocean water contains a certain amount of gold in solution, the amount of gold, however, being quite small so as to make the reclamation thereof barely profitable. There are, however, in California certain salt lakes which have been fed for many years by streams which flow down through gold bearing districts. These lakes contain very large amounts of various mineral salts and contain quite a large proportion of gold in solution in the form of gold salts, such as cyanides and chlorides.

It is a principal object of the invention to provide a process and suitable apparatus for precipitating and recovering the gold and other valuable metallic constituents from the electrically conductive fluent materials contained in these lakes. The process is, however, of very great value in cyanide gold reduction and other metallurgic processes now in use, and greatly simplifies the precipitating of the gold from the conductive liquids employed in these reduction processes. Gold may be reclaimed from a solution by electrolysis, but certain disadvantages have been encountered in electrolytic precipitation, one of which is the precipitation of various salts such as cyanides and chlorides upon the electrodes, thus interfering with the deposit of gold thereon.

I have found that by using a body of mercury as the cathode electrode upon which the gold is to be precipitated, the precipitation of salts is prevented, thus enabling the precipitation to be carried on continuously for a sufficient period of time to render it profitable. The gold as it precipitates is absorbed into the body of mercury from which, after saturation, the gold may be removed by heat treatment.

It is a further object of the invention to provide a novel form of apparatus in which a continuous flow of the gold bearing electrolyte may be passed between the anode and cathode electrodes, without possibility of the electric current flow, grounding with the earth through the flow of the electrolyte.

The especial advantages of the invention and further objects thereof will be made evident hereinafter.

In the drawing which is a diagrammatic view illustrating a preferred form of apparatus with which the process may be practiced, 1 indicates a pump preferably of centrifugal type by which water is drawn through piping 2 from the body of gold containing liquid, not shown, and delivered into piping 3 having outlet valves 4 and 5 therein, which are disposed above intake reservoirs 6 and 7. The reservoirs 6 and 7 are supported on insulating members, such as indicated at 8, so that electric contact with the ground is prevented. Liquid contained in either of the reservoirs 6 and 7 may be allowed to flow through outlet members 10 and 11 having valves 12 and 13, into the mouth 14 of a delivery member 15 preferably in the form of a line of pipe and fitting as shown, which delivery member conveys the solution through a standpipe 16 which extends centrally through the bottom 17 of a circular pan 18 having a circular side wall 19. A body of mercury in the form of a layer 20 is placed in the pan 18, and a pan 22 is supported by insulators 23 in the mouth of the pan 18 in such a manner that the bottom 25 thereof is below the top edge 26 of the pan 18, but is spaced away from the layer of mercury 20.

The solution flows out of the standpipe 16 and passes radially outwardly between the layer of mercury 20 and the bottom of the pan 22, as indicated by the arrows 27, and overflows the edge 26 from whence it flows downwardly through a takeoff member 28 which may be conveniently constructed in conical form as shown. From the takeoff member 28 the solution or suspension, deprived of its values, may be delivered through piping 30 and 31, equipped with valves 32 and 33 to discharge reservoirs 34 and 35 which are also mounted upon insulators 37.

An electric potential to produce electrolytic action is impressed between the pan member 22 which constitutes in the device an anode electrode and the layer of mercury 20 which constitutes the cathode electrode. The electric potential may be produced by any suitable source, such as a dynamo 39 having the positive pole thereof connected with the anode 22 through a conductor 40 having a switch 41 therein, and the negative pole of which is connected with the layer of mercury 20 through a conductor 42 and the pan 17.

It will be recognized that the gold bearing conductive liquid flowing between the electrodes 22 and 20 is in constant contact with the bottom 25 of the pan 22 and the layer 20 of mercury disposed in the pan 17, thus causing the liquid to serve as an electrolyte through which current passes from the anode 22 to the mercury 20 constituting the cathode and causing the precipitation of the gold from the solution in metallic form, this gold being absorbed or amalgamated in a known way by the mercury. The use of mercury as an electrode, as hereinbefore stated, is not accompanied by any appreciable precipitation of salts, or in other words, sufficient quantities of salt to interfere with the precipitation of the values from the solution.

The apparatus shown prevents the loss of current due to grounding with the earth through the inflowing and outflowing streams of conductive liquid. This will become evident in the following description. The reservoirs 6 and 7 are first filled with solution from the lake or other body thereof and the valves 4 and 5 closed. The down spouts 45 from the valves 4 and 5 do not make contact with the reservoirs or the solution with which they have been filled, therefore when the valve 13 of the outlet member 11 is opened so that the conductive liquid from the reservoir 7 will flow into the delivery member 15 there will be no passage of electric current through the flow of said conductive liquid contained in the delivery member 15 and the stream issuing from the outlet member 11, owing to the fact that the reservoir 7 is insulated from the ground. During the flow of solutions from the reservoir 7, the reservoir 6 will not be in electrical contact with the delivery member 15, owing to the fact that there is no flow of solution issuing from the outlet member 10 thereof. Also during the flow of solution from the reservoir 7, the treated solution is conveyed by the takeoff member 28 and the piping 31 into the reservoir 35, the reservoir becoming filled to a level indicated at 50 when the level of solutions in the reservoir 7 is drawn down to the point indicated at 51. It will be recognized that if during the flow from the reservoir 7 to the discharge reservoir 35, the valve 5 should be opened, a circuit with the ground would be formed through the flow of solution from the pipe 3. It will also be seen that if the valve 60 were to be opened during the flow of solution into the reservoir 35, a grounding circuit would be formed through a discharge stream of solution. Therefore, by employing a number of intake and discharge reservoirs, I am enabled to completely insulate the apparatus against grounding. When the reservoir 7 has been emptied, the valve 13 in the outlet member 11 and the valve 33 in the piping 31 are both closed and the valve 12 in the outlet piping 10 connected with the reservoir 6 and the valve 32 in the discharge piping 30 are opened, allowing the flow of solution from the reservoir 6 through the piping 15 between the electrodes 17 and 22 and thence into the discharge reservoir 34. During this time the valve 60 in the discharge piping 61 may be opened to allow discharge of the solution contained in the discharge reservoir 35 and the intake reservoir 7 may be filled by opening the valve 5 in the delivery piping 3, these reservoirs 7 and 35 being isolated from the rest of the apparatus due to the fact that the valve 13 in the outlet member 11 is closed and the valve 33 in the piping 31 is closed. This alternate employment of the intake and discharge reservoirs enables a substantially continuous operation of the apparatus without grounding, owing to the fact that one system of reservoirs are filling while the other system may be emptying.

I claim as my invention:

1. An apparatus for the recovery of precious metals: a cathode of mercury, said cathode having a comparatively large continuous active area; and a flat anode in close proximity to said cathode, said anode having a comparatively large continuous active area opposite the active area of said cathode.

2. In apparatus for precipitating gold from solutions, the combination of: a shallow pan; a layer of mercury in said pan said mercury serving as the negative electrode; a positive electrode of pan form disposed in the mouth of said shallow pan in a manner to provide a relatively extensive flat space between said mercury and said electrode; means for introducing an aqueous metal bearing mixture between said mercury and said electrode; and means for impressing a flow of electric current between said electrode and said mercury.

3. In apparatus for precipitating gold from solutions, the combination of: a shallow pan; a layer of mercury in said pan; an electrode of pan form disposed in the mouth of said shallow pan in a manner to provide a flat space between said mercury and said electrode; a delivery member extending upwardly through the bottom of said shallow tray and in a position centrally beneath said electrode, for delivering a flow of mixture between said electrode and said mercury;

and means for impressing a flow of electric current between said electrode and said mercury.

4. In apparatus for precipitating gold from solutions, the combination of: a shallow pan; a layer of mercury in said pan; an electrode of pan form disposed in the mouth of said shallow pan in a manner to provide a flat space between said mercury and said electrode; a delivery member extending upwardly through the bottom of said shallow tray and in a position centrally beneath said electrode, for delivering a flow of mixture between said electrode and said mercury; a number of insulated intake reservoirs arranged for separate communication with said delivery member; means for filling one of said reservoirs while another of said reservoirs is in communication with said delivery member; and means for impressing a flow of electric current between said electrode and said mercury.

5. In apparatus for precipitating gold from solutions, the combination of: a shallow pan; a layer of mercury in said pan; an electrode of pan form disposed in the mouth of said shallow pan in a manner to provide a flat space between said mercury and said electrode; a delivery member extending upwardly through the bottom of said shallow tray and in a position centrally beneath said electrode, for delivering a flow of mixture between said electrode and said mercury; a number of insulated intake reservoirs arranged for separate communication with said delivery member; means for filling one of said reservoirs while another of said reservoirs is in communication with said delivery member; a takeoff for conveying off the treated mixture insulated discharge reservoirs; means whereby one of said discharge reservoirs may be filled from said takeoff while the other of said discharge reservoirs is being emptied; and means for impressing a flow of electric current between said electrode and said mercury.

6. In apparatus for precipitating precious metals from solutions, the combination of: a body of mercury; an electrode; means for impressing a flow of electric current between said body of mercury and said electrode; insulated intake reservoirs; means for separately filling said reservoirs with mixture to be treated; means for delivering from one of said intake reservoirs a flow of mixture between said electrode and said body of mercury while another of said reservoirs is being filled; insulated discharge reservoirs; and takeoff means for conveying the treated mixture to one of said discharge reservoirs while another of said discharge reservoirs is being emptied.

7. In apparatus for precipitating precious metals from solutions, the combination of: a pair of electrodes; means for impressing a flow of electric current between said electrodes; insulated intake reservoirs; means for separately filling said reservoirs with mixture to be treated; means for delivering from one of said intake reservoirs a flow of mixture between said electrodes while another of said reservoirs is being filled; insulated discharge reservoirs; and takeoff means for conveying the treated mixture to one of said discharge reservoirs while another of said discharge reservoirs is being emptied.

In testimony whereof, I have hereunto set my hand at Los Angeles, California, this 25th day of June, 1923.

WELLS H. BATES.